United States Patent
Ohishi et al.

(10) Patent No.: US 6,710,885 B2
(45) Date of Patent: Mar. 23, 2004

(54) MEASURING SYSTEM

(75) Inventors: Masahiro Ohishi, Tokyo-to (JP); Masaaki Yabe, Tokyo-to (JP); Michio Waki, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 188 days.

(21) Appl. No.: 10/023,386

(22) Filed: Dec. 17, 2001

(65) Prior Publication Data

US 2002/0080368 A1 Jun. 27, 2002

(30) Foreign Application Priority Data

Dec. 26, 2000 (JP) .......................................... 2000-394767

(51) Int. Cl.[7] .............................................. G01B 11/14
(52) U.S. Cl. ...................................... 356/614; 356/4.01
(58) Field of Search ................................. 356/614, 4.01

(56) References Cited

U.S. PATENT DOCUMENTS 4,856,899 A  8/1989  Iwaoka et al. ............... 356/346

FOREIGN PATENT DOCUMENTS

JP  02083352  3/1990
JP  02001318148 A  * 11/2001  .......... G01S/17/93

* cited by examiner

Primary Examiner—Frank G. Font
Assistant Examiner—Roy M. Punnoose
(74) Attorney, Agent, or Firm—Nields & Lemack

(57) ABSTRACT

A measuring system comprises a light projecting unit 1 for projecting a distance measuring light, a distance measuring optical unit 2 for projecting the distance measuring light to an object to be measured and for receiving the reflected distance measuring light from the object to be measured, a photodetection unit 3 for receiving the reflected distance measuring light from the distance measuring optical unit, and a distance measuring circuit 4 for calculating a distance to the object to be measured based on a photodetection signal from the photodetection unit, wherein the light projecting unit comprises a mixing means 40 for mixing the distance measuring light, and the distance measuring optical unit comprises an optical path switching means 42 for switching over the distance measuring light to an outer optical path or to an inner reference optical path and for allowing the photodetection unit to receive the light, and a light amount adjusting means 41 for adjusting a light amount of the distance measuring light received by the photodetection unit, wherein at least one of the mixing means, the optical switching means, and the light amount adjusting means comprises a hollow type motors 56, 57 and 58 as a driving source, and a hollow of the motor is an optical path.

5 Claims, 8 Drawing Sheets

$\theta = \dfrac{\lambda}{d}$ $\qquad M = t(n_1 - n_0)\dfrac{2\pi}{\lambda}$

MEASURING SYSTEM

BACKGROUND OF THE INVENTION

The present invention relates to a measuring system using a laser beam as a distance measuring light, and in particular, to an improvement to achieve a compact and lightweight driving system used for light mixing with the purpose of eliminating the problems in switching of optical paths, in adjustment of a light amount and in removal of a speckle pattern in the laser beam in a light wave distance measuring system.

Description will be given below on an optical system of a conventional type light wave distance measuring system referring to FIG. 5.

The optical system primarily comprises a light projecting unit 1, a distance measuring optical unit 2, a photodetection unit 3, and a distance measuring circuit 4. Further, the light projecting unit 1 comprises a semiconductor laser 5 for emitting a laser beam as a distance measuring light, an optical expander 9 for entering the laser beam emitted from the semiconductor laser 5 to an optical fiber 8 via lenses 6 and 7, gradient index lenses 12 and 13 for entering the laser beam projected from the optical fiber 8 to an optical fiber 11, a phase plate 14 in a circular shape disposed between the lens 6 and the lens 7, and a mixing motor 15 for rotating the phase plate 14. The phase plate 14, the mixing motor 15, and the gradient index lenses 12 and 13 make up a mixing means 16.

Now, description will be given on the distance measuring optical unit 2.

A prism 17 and an objective lens 18 are arranged on an optical axis of the incoming and outgoing distance measuring light. The laser beam projected from the optical fiber 11 is reflected by the prism 17 toward an object to be measured (not shown). Being reflected by the prism 17 and having passed through the objective lens 18, the distance measuring light 19 is projected to the object to be measured. The distance measuring light 19 is reflected by the object to be measured, passes through the objective lens 18, and enters the light wave distance measuring system. Then, the distance measuring light 19 is reflected by the prism 17 and is entered to an optical fiber 26 of a photodetection unit 3 as described later.

A splitting prism 21 is disposed at a position opposite to the prism 17. The splitting prism 21 has a light beam splitting surface 21a and a reflection surface 21b. The light beam splitting surface 21a splits a part of the distance measuring light 19 projected from the optical fiber 11 as an inner reference light 22. A light amount adjusting plate 23 in the circular shape is rotatably mounted between the splitting prism 21 and the prism 17. The light amount adjusting plate 23 is rotated by a light amount adjusting motor 24 and its position is determined. The light amount adjusting plate 23 and the light amount adjusting motor 24 make up a light amount adjusting means 25.

A splitting prism 27 is arranged at a position opposite to the splitting prism 21 with the prism 17 between the splitting prism 27 and the splitting prism 21. The splitting prism 27 has a light beam splitting surface 27a and a reflection surface 27b. The light beam splitting surface 27a allows a reflected distance measuring light 19' reflected by the prism 17 to pass, and the light 19' enters the optical fiber 26. Lenses 28 and 29 are disposed between the reflection surface 21b and the reflection surface 27b. After passing through the lenses 28 and 29, the inner reference light 22 is reflected by the reflection surface 27b and the light beam splitting surface 27a and enters the optical fiber 26.

An optical path switching plate 31 in a circular shape is rotatably mounted between the prism 17 and the lens 29 on one side and the splitting prism 27 on the other side. Two rotating positions of the optical path switching plate 31 can be selected by an optical path switching motor 32. The optical path switching plate 31 and the optical path switching motor 32 make up an optical path switching means 36.

The photodetection unit 3 comprises condenser lenses 33 and 34, and a photodetection element 35. The reflected distance measuring light 19' projected from the optical fiber 26 is converged on the photodetection element 35 by the condenser lenses 33 and 34 and is received by the photodetection element 35.

The distance measuring circuit 4 drives the semiconductor laser 5 to emit the light, and a distance to the object to be measured is calculated based on a photodetection signal from the photodetection element 35.

Now, the mixing means 16 will be described.

When the semiconductor laser 5 emits the laser beam, it is unavoidable that speckle pattern occur. To eliminate the speckle pattern, the mixing means 16 is provided.

One of the causes to induce the light emission speckle pattern of the laser beam is the changes over time of a speckle pattern.

First, description will be given on the changes over time of the speckle pattern.

It is generally known that a light emission wavelength of the semiconductor laser 5 is changed depending on temperature. This is represented in FIG. 6(A). That is, a light emission wavelength $\lambda$ of the semiconductor laser 5 is elongated as a tip temperature Tc is increased, and the light emission wavelength $\lambda$ is continuously changed with respect to the tip temperature Tc. This is because, when a refractive index n of an active layer is varied with the temperature change, the light emission wavelength $\lambda$ of the semiconductor laser 5 is changed accordingly. Here, it is supposed that the change of the refractive index of the active layer due to the temperature change is $\Delta n$. Then, when $\Delta n$ L, i.e. the change of an optical length of the active layer, is smaller than ½ of a resonance wavelength of the semiconductor laser 5, the resonance wavelength is continuously changed. When $\Delta n$ L is greater than ½ of the resonance wavelength of the semiconductor laser 5, a discontinuous phenomenon of the wavelength change called "mode jump" occurs.

In this phenomenon called "mode jump", when the resonance wavelength of the semiconductor laser 5 is changed by more than one-half of the wavelength of the standing wave of light in the longitudinal direction of the resonator, it is jumped to longitudinal mode which is different from the oscillation mode up to that moment.

Now, referring to FIG. 6(B), description will be given on the case where a rectangular modulated electric current is supplied to the semiconductor laser 5.

It is assumed here that an electric current of a rectangular wave as shown in FIG. 6(B)(1) is supplied to the semiconductor laser 5 from the time t0 to the time t1. Then, the speckle pattern as shown in FIG. 7 is developed due to the coherence on the semiconductor laser 5. On the other hand, the tip of the semiconductor laser 5 is heated up due to the driving current, and the temperature is increased up to a temperature value where a balance is kept between the heating value and a heat radiation value to a copper base where the semiconductor laser 5 is mounted or into the air. FIG. 6(B)(2) shows such temperature rise of the tip.

When the temperature of the semiconductor laser 5 is increased, the light emission wavelength $\lambda$ is changed because of the cause as described above. When the light emission wavelength $\lambda$ is changed, the speckle pattern as shown in FIG. 7 developed as an interference pattern is changed in association with such change. Light intensity wave-forms of the points A and B in FIG. 7 are shown in FIG. 6(B)(3) and FIG. 6(B)(4) respectively. That is, at the point A of FIG. 7, the light intensity of the speckle pattern is at a high position at the time t0, and the light intensity is gradually decreased as the light emission wavelength $\lambda$ is changed (FIG. 6(B)(3)). On the other hand, at the point B in FIG. 7, the light intensity of the speckle pattern is at a weak position at the time T0, while the light intensity is gradually increased as the light emission wavelength $\lambda$ is changed (FIG. 6(B)(4)).

As a result, when the wave-form at the point A is compared with the wave-form at the point B, the phase of basic wave component of the wave-form is deviated, and it is certain that the phase is more advanced in the former than in the latter. When the semiconductor laser 5 is modulated, the light emission wave-form becomes uneven due to the coherence and to dependency of the wavelength on the temperature.

The mixing means 16 is provided for the purpose of eliminating such light emission speckle pattern.

Now, the mixing means 16 will be described.

The mixing means 16 comprises two elements. One element is the phase plate 14 as described above. The other is the gradient index lenses 12 and 13. The gradient index lenses 12 and 13 are provided for the purpose of mixing the speckle pattern caused by the difference of the response due to an exit angle of the semiconductor laser 5.

Next, description will be given on the principle of the phase plate 14.

First, referring to FIG. 8, description will be given on one example of phase-modulation grids as generally in use.

On the phase-modulation grids, recesses and projections each having a depth of "t" are provided with spacing of pitch "d" on a parallel flat glass. When the light with wavelength $\lambda$ enters this phase-modulation grids, diffraction occurs.

Let us discuss the pattern of the phase plate 14 shown in FIG. 9. The phase plate 14 comprises a checkered pattern (hound's tooth check) with shaded portions and open portions, each having one side with a length of d/2. The shaded portions are projections, and the open portions are recesses. A phase difference between the recesses and the projections is $\pi/2$.

Next, description will be given on operation when the phase plate 14 is placed between the lenses 6 and 7, referring to FIG. 10.

The light emitted from the semiconductor laser 5 is turned to a parallel beam by the lens 6 and the beam is diffracted by the phase plate 14. A 0-order light and a diffracted light are converged by the lens 7, and an image is formed on an end surface of the optical fiber 8. The image on the end surface of the optical fiber 8 is an image which is made up of an image formed by the 0-order diffraction light and by the diffraction light overlapped one upon another.

The phase plate 14 is rotated by the motor 15. Then, a phase plate pattern on the parallel light beam between the lens 6 and the lens 7 is changed. In association with this, a diffraction pattern of the light is also changed, and an image forming pattern to form the image on the end surface of the optical fiber 8 is also changed over time. By the change of the image forming pattern, the light interference condition in the optical fiber 8 is changed, and the speckle pattern on the exit end of the optical fiber 8 is also changed over time.

As a result, the speckle pattern shown in FIG. 6 and FIG. 7 is changed over time. By averaging the wave-form in relation to time, the speckle pattern can be eliminated. The pitch of the recesses and the projections of the phase plate 14 is "d". Thus, a m-order diffraction angle θm is given as follows:

$$\theta m = m \times (\lambda/d)$$

As a result, a m-order diffraction image on the end surface of the optical fiber 11 is formed within a given range. When the phase plate 14 is rotated, various types of image patterns are formed within a given range. As a result, mixing can be performed with high efficiency.

Now, the light amount adjusting means 25 will be described.

The laser beam serving as the distance measuring light 19 emitted from the semiconductor laser 5 is split by the splitting prism 21, and a part of the laser beam is split to the inner reference light 22. As to be described later, the distance measuring circuit 4 calculates a distance to the object to be measured by detecting the phase difference between the distance measuring light 19 and the inner reference light 22.

In the reflected distance measuring light 19' reflected from the object to be measured, the light amount is extensively changed depending on the distance up to the object to be measured, while the inner reference light 22 has the light amount on a constant level. In this respect, it is very difficult to perform automatic gain control by an electronic circuit with respect to a receiving signal of high dynamic range, and an error in distance measurement is also increased. For this reason, with the purpose of keeping the light amounts of the reflected distance measuring light 19' and the inner reference light 22 on almost the same level, the light amount adjusting means 25 is provided.

Description will be given below on the light amount adjusting plate 23, which constitutes the light amount adjusting means 25 and is functioning as a density variable filter, referring to FIG. 11.

The light amount adjusting plate 23 comprises a distance measuring light density filter sector 23a in a ring-like shape, and an inner reference light density filter sector 23b formed coaxially on inner side of the distance measuring light density filter sector 23a. On the distance measuring light density filter sector 23a, the density is gradually increased in a counterclockwise direction. On the inner reference light density filter sector 23b, the density is gradually increased in a clockwise direction, i.e. in a direction opposite to the distance measuring light density filter sector 23a.

The light amount of the reflected distance measuring light 19' received by the photodetection element 35 can be equalized with that of the inner reference light 22 by increasing the density of the distance measuring light density filter sector 23a and by suppressing the light amount in case the object to be measured is in a near distance, and by suppressing the light amount of the inner reference light 2 by the inner reference light density filter sector 23b in case the object is at a long distance.

Next, the optical path switching means 36 will be described.

As described above, there are two optical paths in the distance measuring optical unit 2: an optical path of the reflected distance measuring light 19' reflected from the object to be measured, and an optical path of the inner reference light 22. The photodetection element 35 must enter the laser beams on two optical paths alternately.

As shown in FIG. 12, the optical path switching plate 31 has slits 31a and 31b each in an arcuate shape. The center of an arc of each of these slits is the same as the rotation center of the optical path switching plate 31. The slit 31a is on the optical path of the reflected distance measuring light 19', and the slit 31b is on the optical path of the inner reference light 22. These slits are formed at such positions that they do not overlap one upon another.

When the optical path switching plate 31 is reciprocally moved at a given rotation angle by the optical path switching motor 32, it is possible to enter the reflected distance measuring light 19' and the inner reference light 22 alternately to the photodetection unit 3.

The semiconductor laser 5 emits a pulsed laser beam. It has relatively higher power and can generate the pulsed laser beam with a duty ratio of about 0.01%.

In the laser beam emitted from the semiconductor laser 5, the speckle pattern is eliminated by the mixing means 16, and the laser beam is split by the splitting prism 21 to the distance measuring light 19 and the inner reference light 22. Then, the light amount is adjusted by the light amount adjusting means 25 so that the light amount of the inner reference light 22 received by the photodetection element 35 is equalized with that of the reflected distance measuring light 19'. The light amount adjustment is performed by selecting the rotating position of the light amount adjusting plate 23 as described above.

The reflected distance measuring light 19' is reflected by the object to be measured, enters the light wave distance measuring system, and is reflected by the prism 17. The inner reference light 22 passes through the lenses 28 and 29. By the optical path switching means 36, the laser beam entering the photodetection element 3 is selected between the reflected distance measuring light 19' and the inner reference light 22. In the optical path switching operation, the optical path switching plate 31 is reciprocally rotated at a given angle as described above. When the reflected distance measuring light 19' passes through the slit 31a, the distance measuring light 19 enters the photodetection element 35. When the inner reference light 22 passes through the slit 31b, the inner reference light 22 enters the photodetection element 35.

The distance to the object to be measured is determined based on the difference between the time of emission of the pulsed beam and the time when the pulsed beam is received by the photodetection element 35 after the distance measuring light 19 is reflected by the object to be measured.

The light wave distance measuring system uses a great number of electronic component parts, and delay time of the electronic parts is very likely to be influenced by the factors such as temperature. Thus, instability may arise within the light wave distance measuring system. For this reason, measurement is performed on the distance measuring light 19 and also on the inner reference light 22. By finding the difference of the measured values, it is possible to eliminate unstable elements in the light wave distance measuring system and to improve the accuracy of distance measurement.

For distance measurement, the pulsed laser beam is not necessarily used. The laser beam may be turned to a modulated light. The reflected distance measuring light 19' and the inner reference light 22 may be alternately received. By measuring a phase difference of the modulated light, the distance can be measured.

The mixing means 16, the light amount adjusting means 25, and the optical path switching means 36 as described above are all designed in such manner that a disk to shield optical path is rotated by a motor. However, in each of the phase plate 14, the light amount adjusting plate 23, and the optical path switching plate 31, a portion on only one side from the rotation center is used. In order that the lenses 6 and 7 do not interfere with the mixing motor 15, that the light amount adjusting motor 24 does not interfere with the splitting prism 21, and that the optical switching motor 32 does not interfere with the splitting prism 27, each of the phase plate 14, the light amounting adjusting plate 23, and the optical path switching plate 31 must have a diameter sufficiently large. For this reason, a large useless space is required for accommodating the portion not in use of the disk, and this has been a hindrance to design the light wave distance measuring system in a compact size.

Further, quick rotation and response are required for the phase plate 14, the light amount adjusting plate 23, and the optical path switching plate 31. When quick rotation and response are required, it is preferable that rotation moment is lower in each of the phase plate 14, the light amount adjusting plate 23, and the optical path switching plate 31. However, rotation moment is proportional to a square of a diameter. If diameters of the phase plate 14, the light amount adjusting plate 23, and the optical path switching plate 31 are increased, the rotation moment is extremely increased. For this reason, a large-capacity motor is required, and this means that consumption power is increased.

SUMMARY OF THE INVENTION

It is an object of the present invention to provide a small-size and small-power light wave distance measuring system, which comprises a mixing means, a light amount adjusting means and an optical path switching means in small sizes and of simple structures.

To attain the above object, the measuring system according to the present invention comprises a light projecting unit for projecting a distance measuring light, a distance measuring optical unit for projecting the distance measuring light to an object to be measured and for receiving the reflected distance measuring light from the object to be measured, a photodetection unit for receiving the reflected distance measuring light from the distance measuring optical unit, and a distance measuring circuit for calculating a distance to the object to be measured based on a photodetection signal from the photodetection unit, wherein the light projecting unit comprises a mixing means for mixing the distance measuring light, and the distance measuring optical unit comprises an optical path switching means for switching over the distance measuring light to an outer optical path or to an inner reference optical path and for allowing the photodetection unit to receive the light, and a light amount adjusting means for adjusting a light amount of the distance measuring light received by the photodetection unit, wherein at least one of the mixing means, the optical switching means, and the light amount adjusting means comprises a hollow type motor as a driving source, and a hollow of the motor is an optical path. Also, the present invention provides the measuring system as described above, wherein at least one of optical members used in the mixing means, the optical path switching means and the light amount adjusting means is provided in the hollow, and there is provided a motor control means for controlling the motors so that the optical members can have rotation amounts as necessary. Further, the present invention provides the measuring system as described above, wherein the distance measuring light is a laser beam, there is provided the motor with a hollow shaft and the mixing optical member arranged on the hollow shaft, and the mixing optical member is rotated by the motor. Also, the present invention provides the measuring system as described above, wherein the distance measuring light is a laser beam, there is provided the motor with a hollow shaft and the light amount adjusting member arranged on the hollow shaft, and the light amount adjusting member is rotated by the motor and the light amount of the laser beam is adjusted. Further, the present invention provides the measuring system as described above, wherein the distance measuring light is a laser beam, there is provided the motor with a hollow shaft and the optical path switching member arranged on the hollow shaft, and the optical path switching member is rotated by the motor and the optical path of the laser beam is switched over.

DETAILED DESCRIPTION OF THE PREFERRED EMBODIMENT

Figure 1:
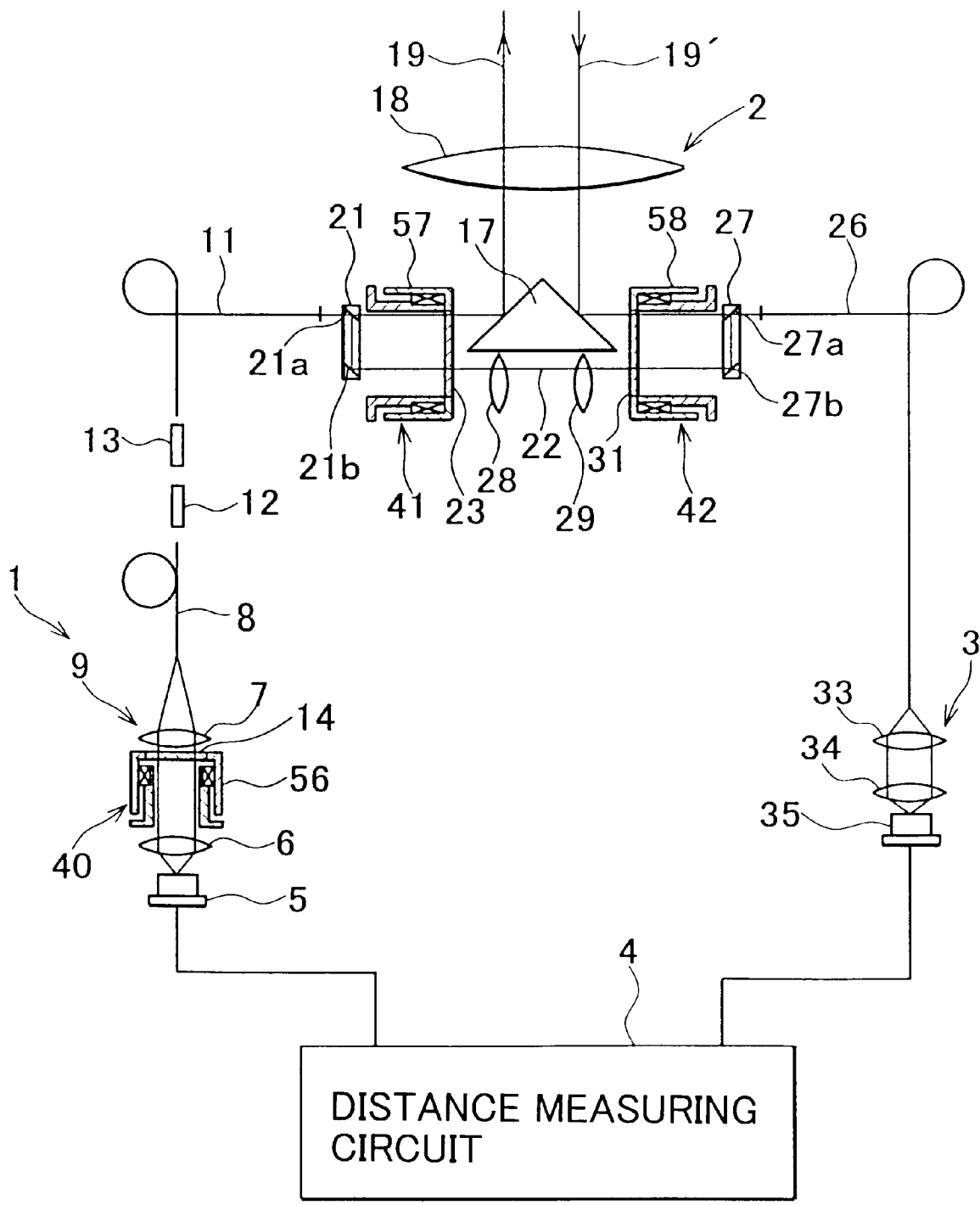
FIG. 1 is a schematical diagram showing an embodiment of the present invention.

Description will be given below on an embodiment of the present invention referring to the drawings.

Figure 5:
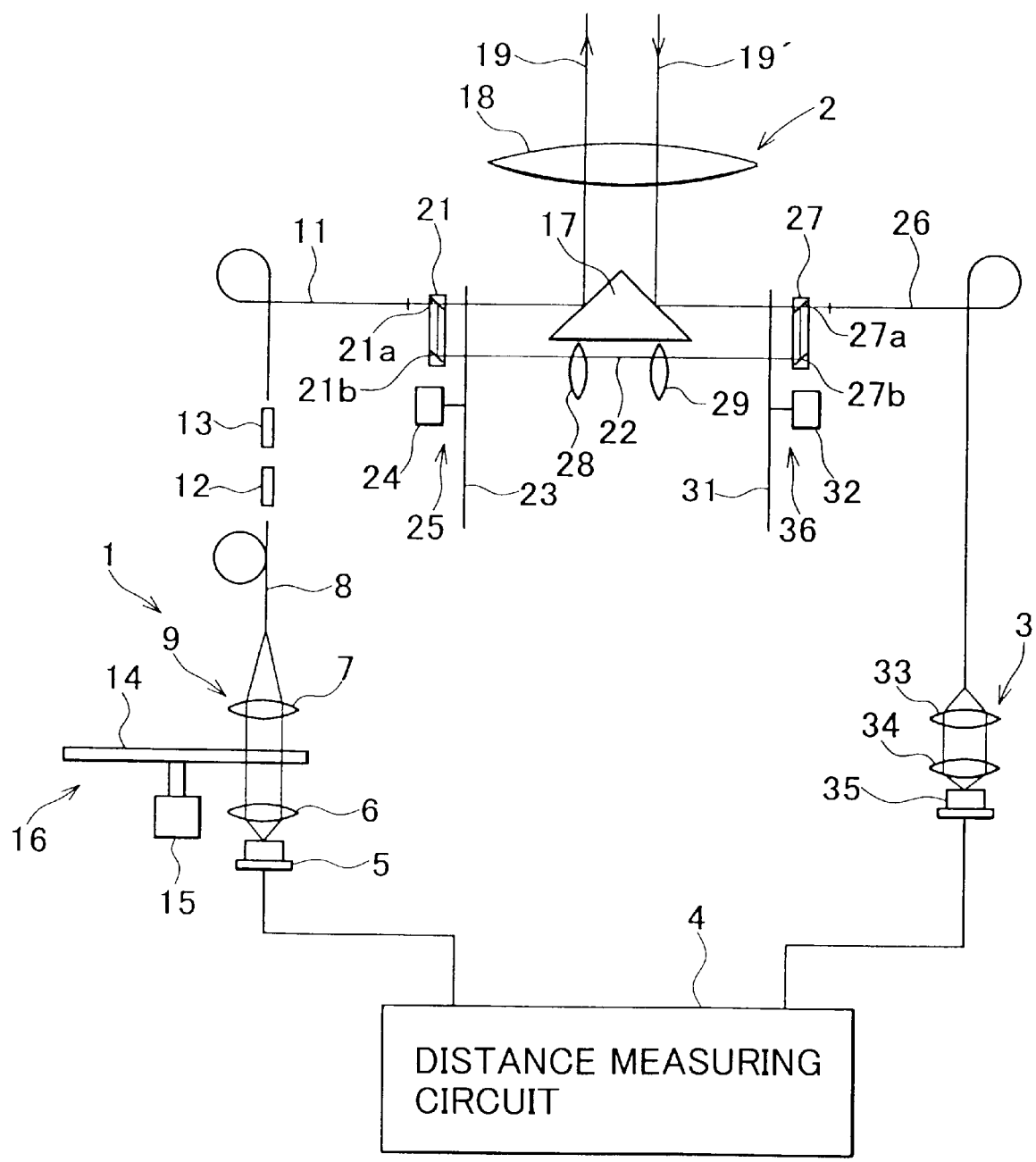
FIG. 5 is a schematical diagram of a conventional system.
Figure 6:
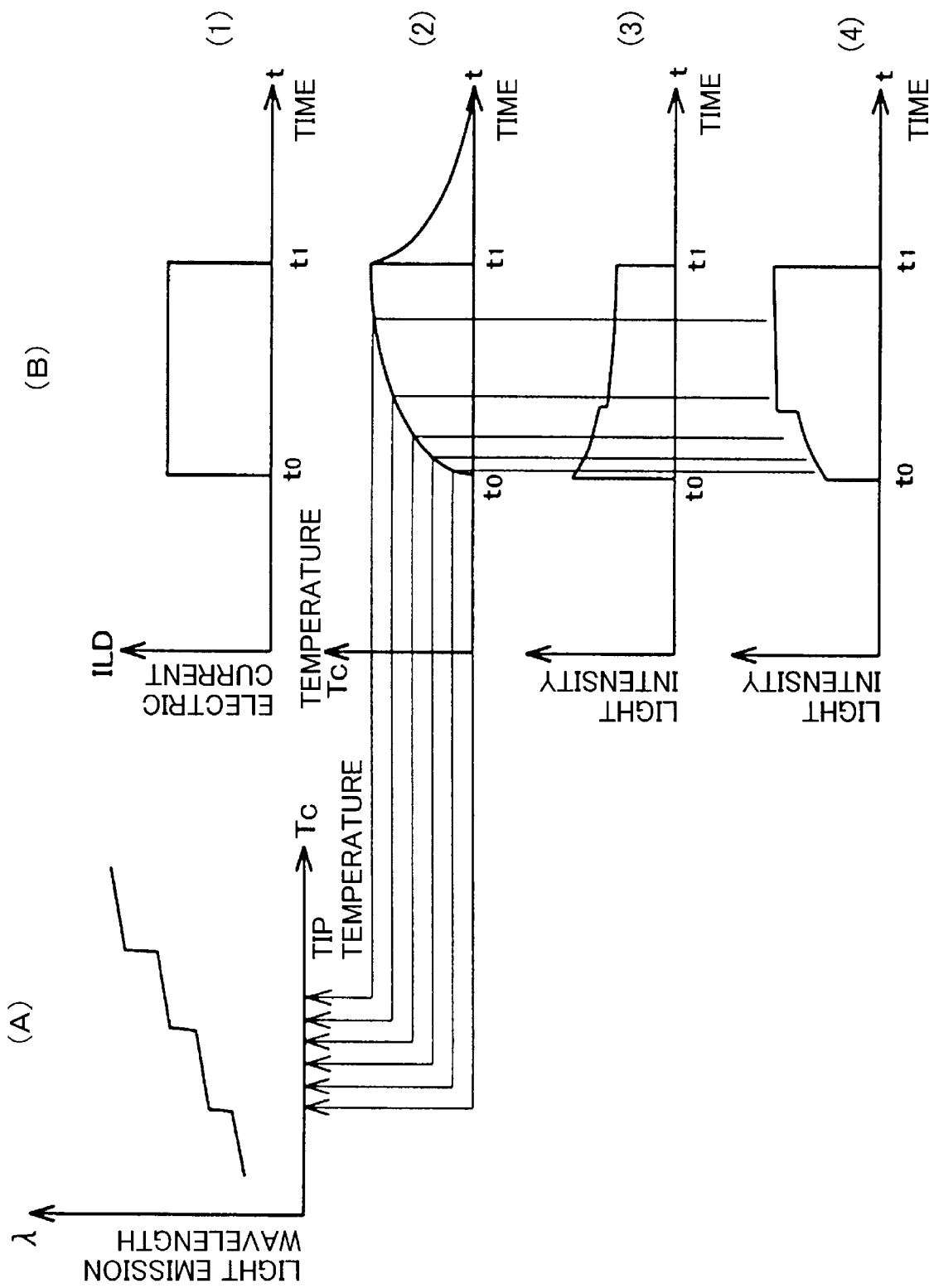
FIG. 6(A) and FIG. 6(B) each represents diagrams showing changes over time of a light emitting condition of a semiconductor laser.
Figure 7:
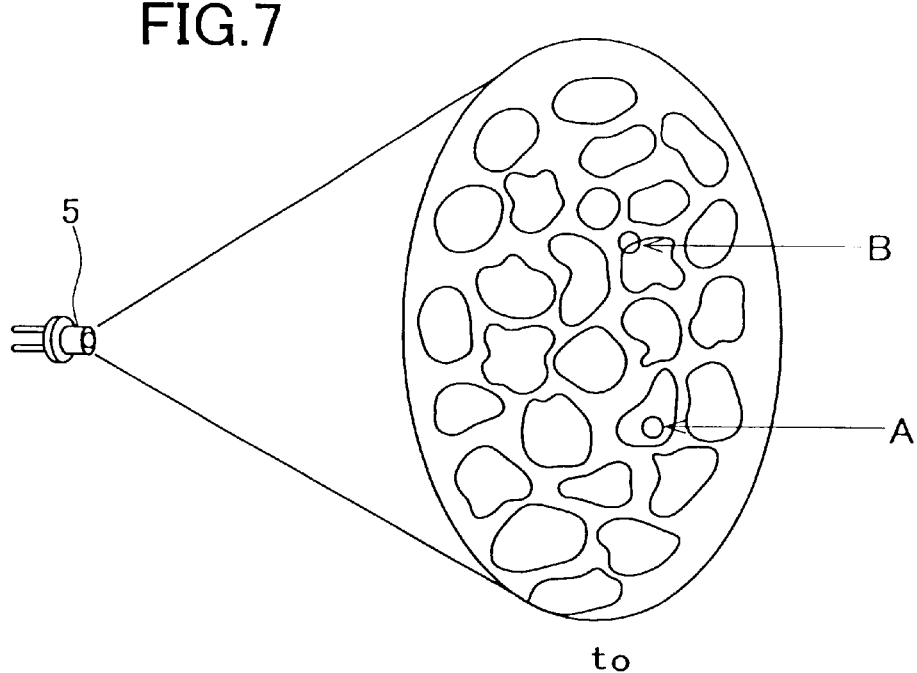
FIG. 7 is a drawing to explain condition of a speckle pattern (wave-form unevenness) in the laser beam.

FIG. 1 shows an optical system of a light wave distance measuring system according to the present embodiment. In the figure, the same components as shown in FIG. 5 are referred by the same symbols.

The optical system primarily comprises a light projecting unit 1, a distance measuring optical unit 2, a photodetection unit 3, and a distance measuring circuit 4.

The light projecting unit 1 comprises a semiconductor laser 5 for emitting a laser beam, an optical expander 9 for entering the laser beam emitted from the semiconductor laser 5 to an optical fiber 8 via lenses 6 and 7, a mixing means 40 provided between the lens 6 and the lens 7, and gradient index lenses 12 and 13 for entering the laser beam projected from the optical fiber 8 to an optical fiber 11 after changing position angle.

Figure 2:
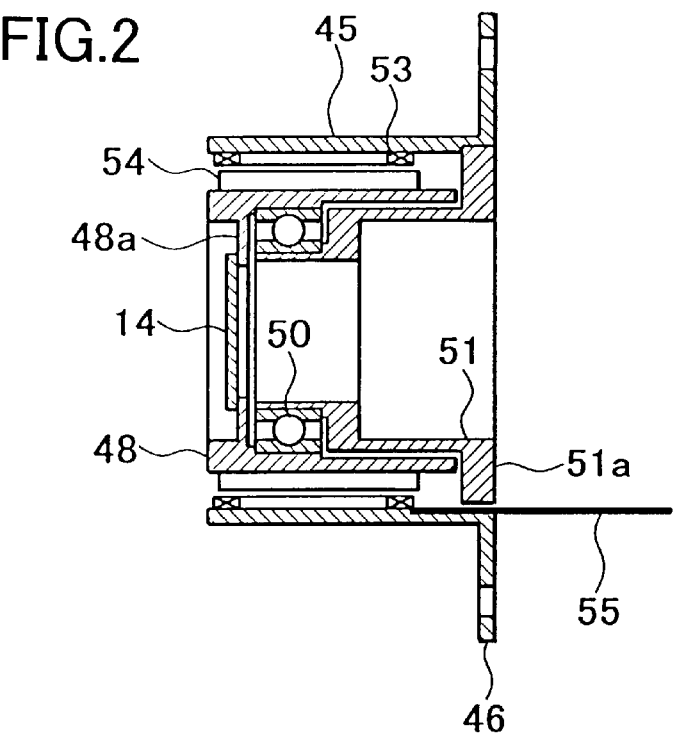
FIG. 2 is a cross-sectional view of a hollow type motor used in the embodiment.
Figure 3:
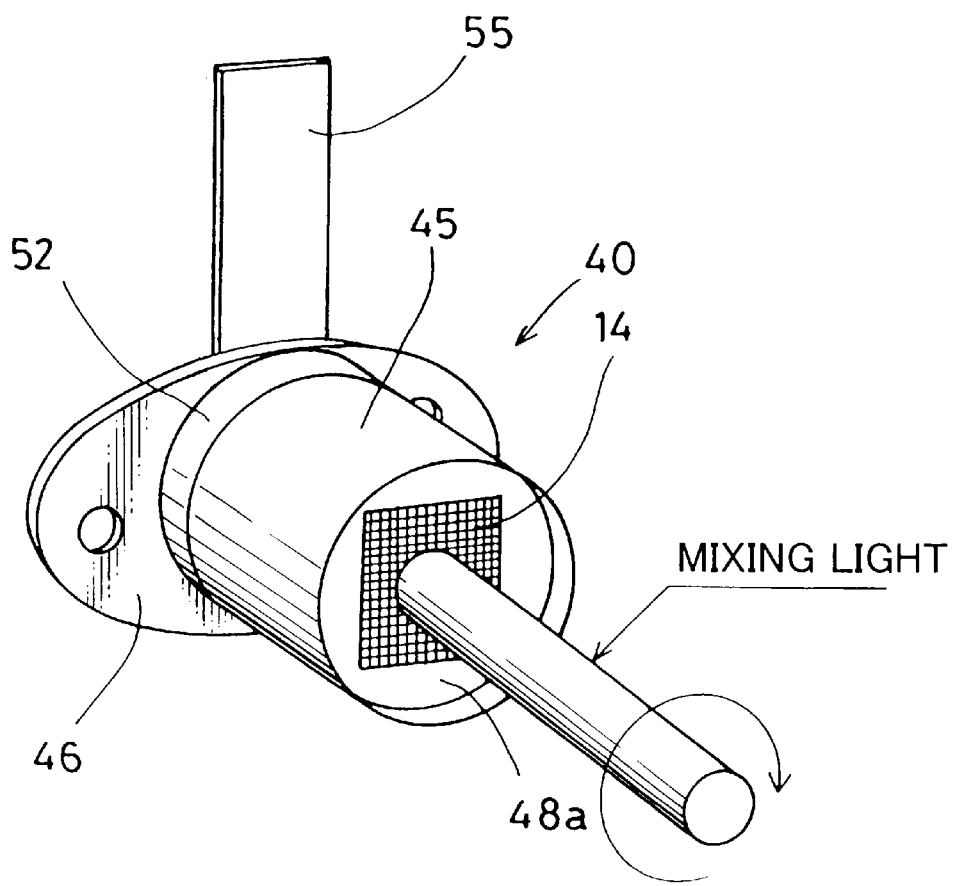
FIG. 3 is a perspective view of a mixing means using the hollow type motor.
Figure 4:
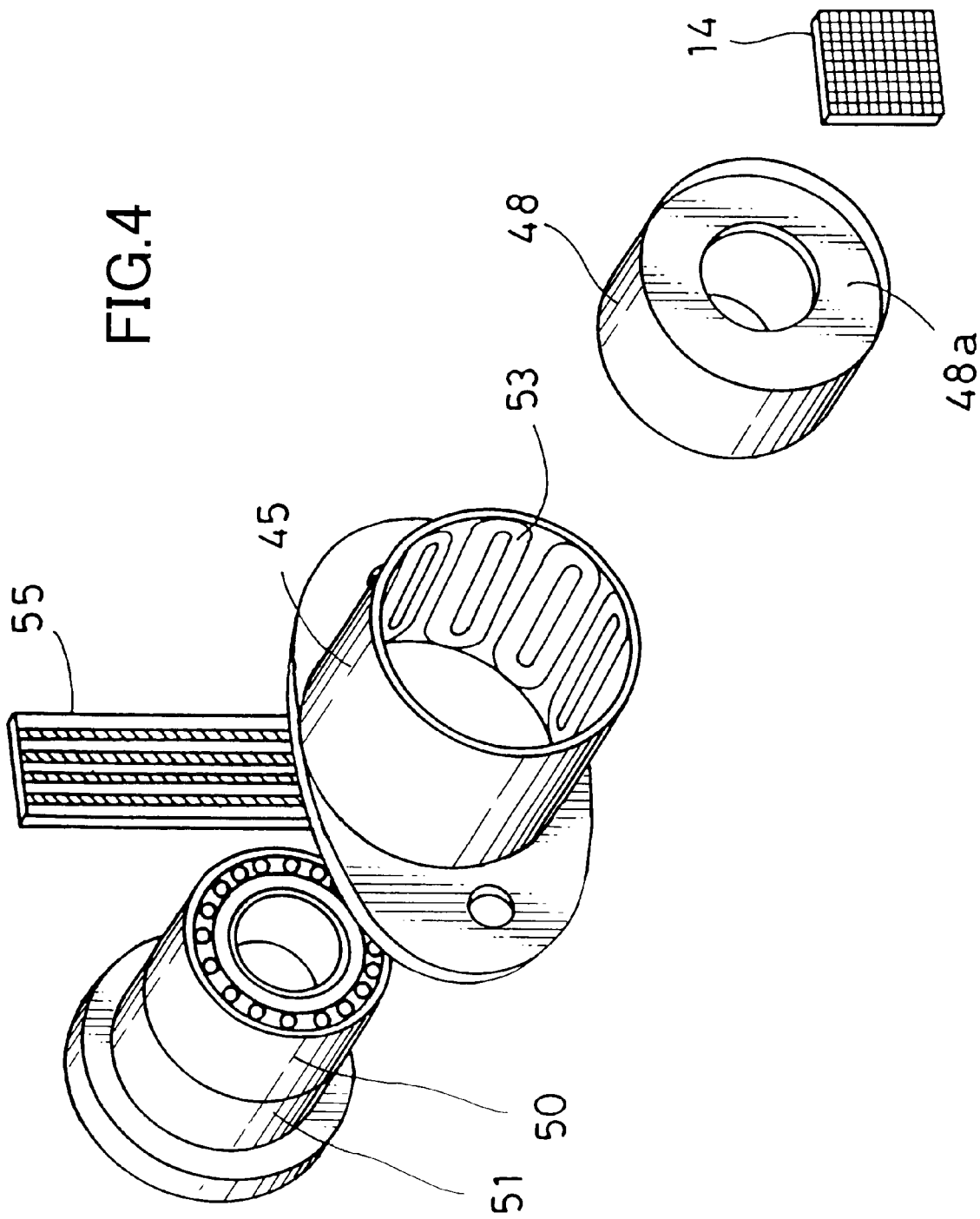
FIG. 4 is an exploded perspective view of the mixing means.

Description will be given below on the mixing means 40 referring to FIG. 2 to FIG. 4.

A casing 45 in a cylindrical shape is provided coaxially with an optical axis of the light projecting unit 1. A hollow fixed shaft 51 is fixed on and integrated with the casing 45 via a flange unit 51a, and a cylindrical space is defined between the casing 45 and the hollow fixed shaft 51. A rotary cylinder 48 is accommodated in the space and is rotatably engaged in the hollow fixed shaft 51 via a bearing 50. The casing 45 has a flange 46, and it is fixed on a structural member (not shown) of the light wave distance measuring system via the flange 46.

On an inner cylindrical surface of the casing 45, coils 53 are fixed with a predetermined pitch in a circumferential direction. Lead wires 55 connected with the coils 53 are guided between the flange 46 and a flange unit 51a and extended and are connected to a control unit (not shown).

Figure 8:
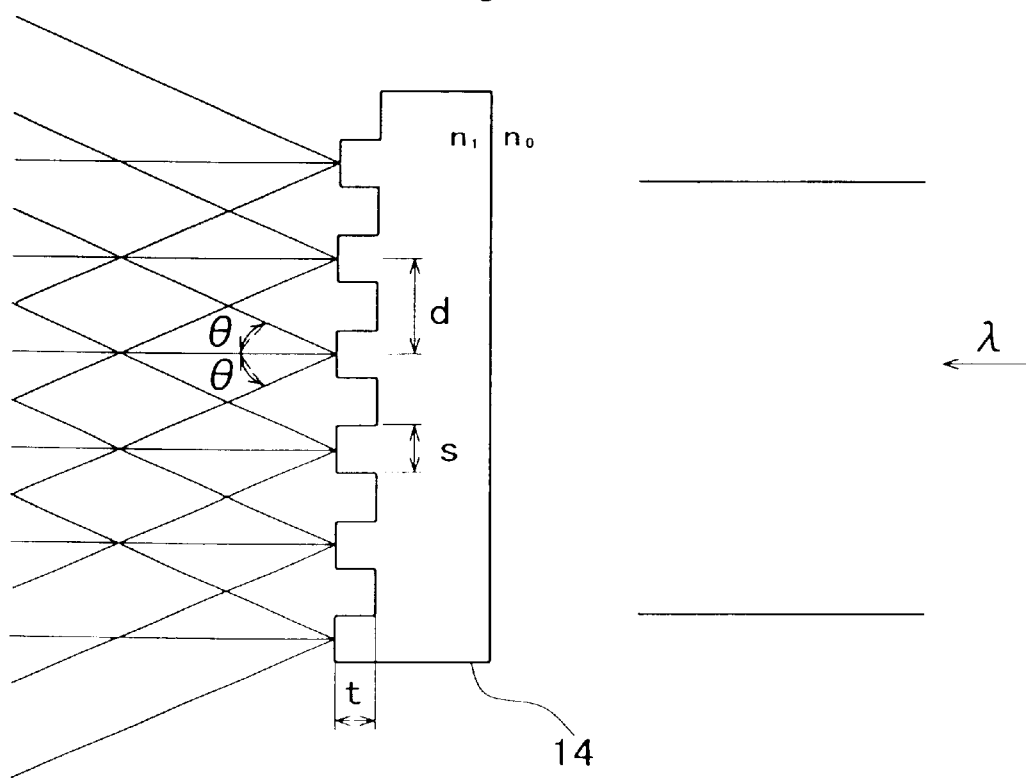
FIG. 8 is a cross-sectional view of a phase plate.
Figure 9:
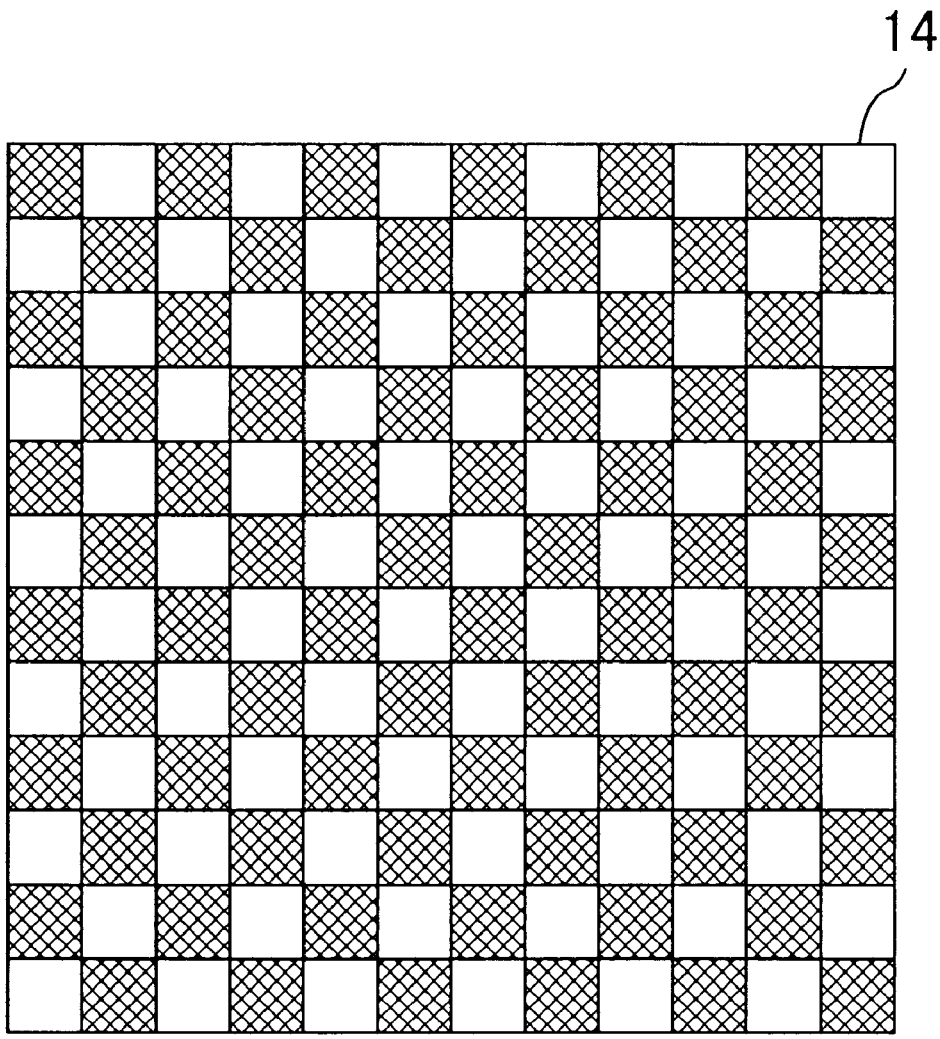
FIG. 9 is a plan view of the phase plate.
Figure 9:
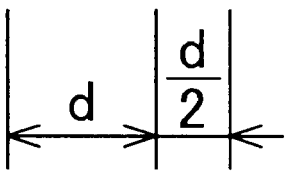
Figure 9:
Figure 9:
Figure 10:
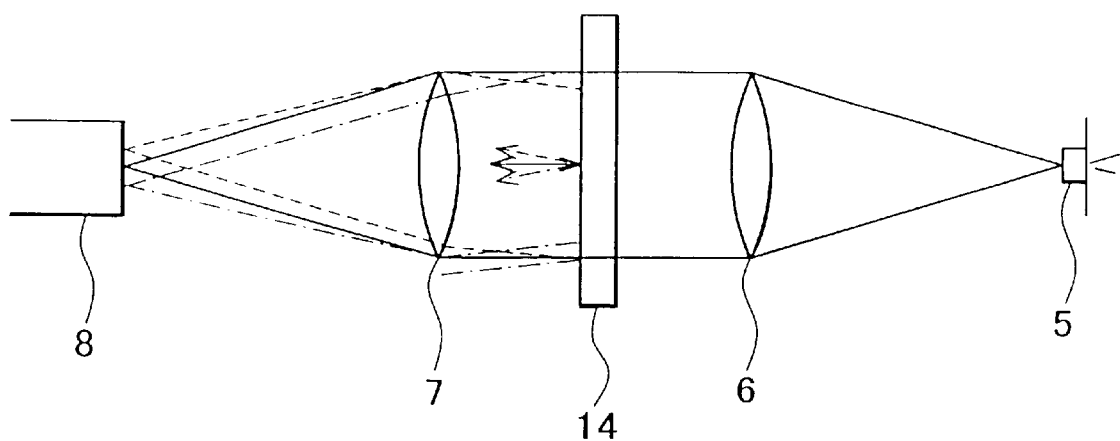
FIG. 10 is a drawing to explain a mixing condition when the phase plate is used.

On an outer cylindrical surface of the rotary cylinder 48, magnets 54 are attached with a predetermined pitch in a circumferential direction so that the magnets are faced to the coils 53. In the rotary cylinder 48, an inner collar 48a is arranged at a position not to interfere with the hollow fixed shaft 51, and a phase plate 14 is attached on the inner collar 48a so as to traverse the optical axis of the light projecting unit 1. The phase plate 14 has the same structure as the phase plate shown in FIG. 8 and FIG. 9.

An electric current is supplied to the coils 53 via the lead wires 55, and the rotary cylinder 48 is rotated. The phase plate 14 is rotated with respect to the light beam, and a speckle pattern in the laser beam emitted from the semiconductor laser 5 are eliminated.

That is, the mixing means 40 is a hollow type motor 56, which comprises the casing 45, the rotary cylinder 48, the hollow fixed shaft 51, the coils 53 and the magnets 54, and the phase plate 14 is provided in such manner as to block the hollow portion.

Now, description will be given on the distance measuring optical unit 2.

On the optical axis of the incoming and outgoing distance measuring light, a prism 17 and an objective lens 18 are arranged. With the prism 17 at the center, a light amount adjusting means 41 is arranged on an optical axis of the incident light entering the prism 17, and an optical path switching means 42 is disposed on an optical axis of the reflection light from the prism 17. Further, a splitting prism 21 is arranged on an entrance side of the light amount adjusting means 41 and a splitting prism 27 is arranged on an exit side of the optical path switching means 42, and these components make up the distance measuring optical unit 2.

The photodetection unit 3 comprises an optical fiber 26 for guiding the laser beam projected from the splitting prism 27 toward a photodetection element 35, and condenser lenses 33 and 34 for converging the laser beam to the photodetection element 35.

The distance measuring circuit 4 drives the semiconductor laser 5 to emit the light, and a distance to an object to be measured is calculated based on a photodetection signal from the photodetection element 35.

Figure 11:
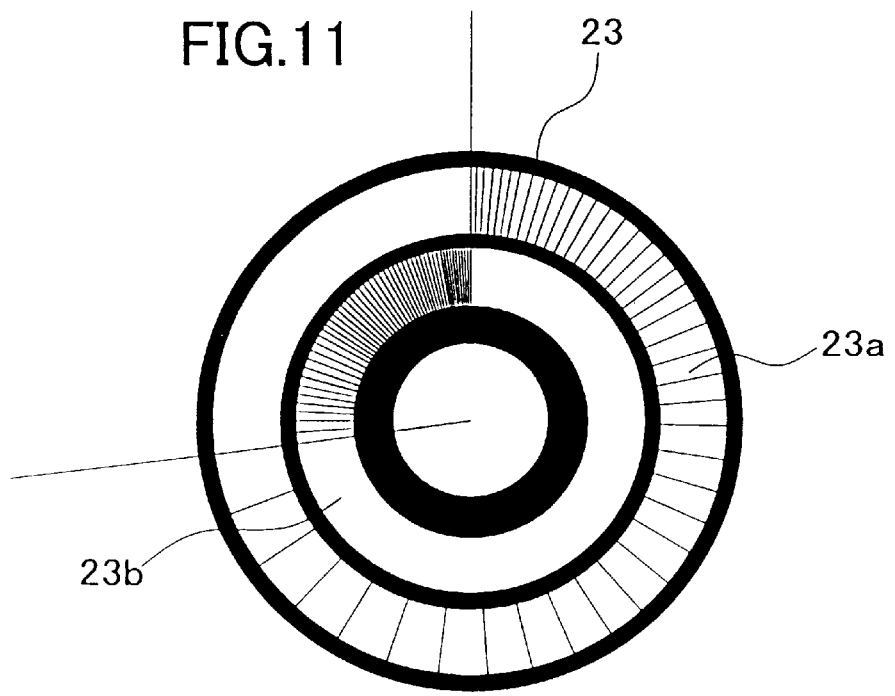
FIG. 11 is a drawing to explain a light amount adjusting plate.

The light amount adjusting means 41 comprises a hollow type motor 57 having the same structure as the hollow type motor 56 used in the mixing means 40, and the light amount adjusting plate 23 is arranged to block the hollow portion of the hollow type motor 57. The light amount adjusting plate 23 has the same structure as the one shown in FIG. 11.

The splitting prism 21 splits the light beam projected from the optical fiber 11 to a distance measuring light 19 and an inner reference light 22. The distance measuring light 19 passes through a peripheral portion of the light amount adjusting plate 23, i.e. a distance measuring light density filter sector 23a. The inner reference light 22 passes through a portion inside the transmitting position of the distance measuring light 19, i.e. an inner reference light density filter sector 23b.

Figure 12:
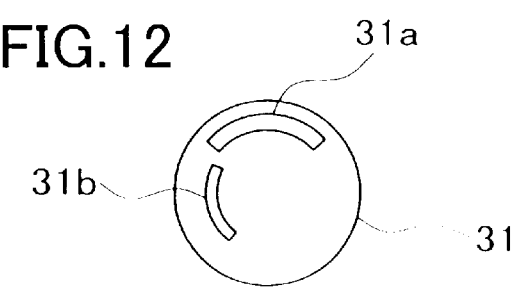
FIG. 12 is a drawing to explain an optical path switching plate.

The optical path switching means 42 comprises a hollow type motor 58 having the same structure as the hollow type motor 56, and the optical path switching plate 31 is provided to block the hollow portion of the hollow type motor 58. The optical path switching plate 31 has the same structure as the one shown in FIG. 12. A reflected distance measuring light 19' reflected by the prism 17 passes through a slit 31a on a peripheral portion of the optical path switching plate 31. The inner reference light 22 passes through a slit 31b on an inner portion of the optical path switching plate 31.

While the semiconductor laser 5 is driven by the distance measuring circuit 4, the electric current is supplied to the hollow type motor 56 via the lead wires 55, and the hollow type motor 56 rotates the phase plate 14. By the rotation of the phase plate 14 and by the gradient index lenses 12 and 13, the speckle pattern is eliminated. The laser beam projected from the optical fiber 11 is split to the distance measuring light 19 and to the inner reference light 22 by the splitting prism 21. Depending on the distance to the object to be measured and on the reflecting condition of the distance measuring light 19 and the inner reference light 22 from the object to be measured, the hollow type motor 57 rotates the light amount adjusting plate 23, and the rotating position of the light amount adjusting plate 23 is selected in such manner that receiving light amounts at the photodetection element 35 will be the same.

At a predetermined time interval, the optical path switching plate 31 is rotated in normal or reverse directions by the hollow type motor 58. As a result, the reflected distance measuring light 19' and the inner reference light 22 entering the photodetection unit 3 are alternately switched over.

As described above, in the distance measuring circuit 4, a distance to the object to be measured is calculated based on a photodetection signal of the reflected distance measuring light 19' and the inner reference light 22 received by the photodetection element 35.

As described above, the phase plate 14, the light amount adjusting plate 23, and the optical path switching plate 31 are rotated by the hollow type motors 56, 57, and 58, and the laser beam passes through the hollow portion of each of these motors. Accordingly, rotation centers of the phase plate 14, the light amount adjusting plate 23, and the optical path switching plate 31 can be approximately aligned with the optical axis of the laser beam. Therefore, the entire area of each of the phase plate 14, the light amount adjusting plate 23, and the optical path switching plate 31 can be effectively used. This contributes to extensive reduction of the size of each component.

The component rotated and moved by the hollow type motor is not limited to the components such as the phase plate 14, the light amount adjusting plate 23, the optical path switching plate 31, etc., and it may be a moving part of a focusing mechanism. The use of the hollow type motor makes it possible to eliminate the use of the components such as gear mechanism for transmitting power between a rotator or a moving part and the motor, and this contributes to more compact design of the structure.

According to the present invention, the rotating shaft of the motor to rotate members necessary for distance measurement can be arranged coaxially with the optical axis. This makes it possible to extensively reduce the size of each member and also to decrease rotation moment of the rotating part. As a result, responsivity can be increased by a small size motor. The members and the motor can be designed in smaller sizes, and this results in successful designing of the light wave distance measuring system in more compact size and lightweight structure.

What is claimed is:

1. A measuring system, comprising a light projecting unit for projecting a distance measuring light, a distance measuring optical unit for projecting the distance measuring light to an object to be measured and for receiving the reflected distance measuring light from the object to be measured, a photodetection unit for receiving the reflected distance measuring light from the distance measuring optical unit, and a distance measuring circuit for calculating a distance to the object to be measured based on a photodetection signal from said photodetection unit, wherein said light projecting unit comprises a mixing means for mixing the distance measuring light, and said distance measuring optical unit comprises an optical path switching means for switching over the distance measuring light to an outer optical path or to an inner reference optical path and for allowing said photodetection unit to receive the light, and a light amount adjusting means for adjusting a light amount of the distance measuring light received by said photodetection unit, wherein at least one of said mixing means, said optical switching means, and said light amount adjusting means comprises a hollow type motor as a driving source, and a hollow of the motor is an optical path.

2. A measuring system according to claim 1, wherein at least one of optical members used in the mixing means, the optical path switching means and the light amount adjusting means is provided in the hollow, and there is provided a motor control means for controlling the motors so that the optical members can have rotation amounts as necessary.

3. A measuring system according to claim 1, wherein the distance measuring light is a laser beam, there is provided the motor with a hollow shaft and the mixing optical member arranged on said hollow shaft, and said mixing optical member is rotated by the motor.

4. A measuring system according to claim 1, wherein the distance measuring light is a laser beam, there is provided the motor with a hollow shaft and the light amount adjusting member arranged on said hollow shaft, and said light amount adjusting member is rotated by said motor and the light amount of the laser beam is adjusted.

5. A measuring system according to claim 1, wherein the distance measuring light is a laser beam, there is provided the motor with a hollow shaft and the optical path switching member arranged on the hollow shaft, and the optical path switching member is rotated by the motor and the optical path of the laser beam is switched over.

* * * * *